United States Patent [19]
Embro, Jr.

[11] 4,282,699
[45] Aug. 11, 1981

[54] HEAT SEALING APPARATUS

[75] Inventor: Joseph J. Embro, Jr., Atlanta, Ga.

[73] Assignee: The Mead Corporation, Dayton, Ohio

[21] Appl. No.: 69,945

[22] Filed: Aug. 27, 1979

[51] Int. Cl.³ .................. B65B 7/28; B67B 3/04; B67B 3/08

[52] U.S. Cl. ................ 53/298; 53/300; 53/367; 53/368; 53/373; 156/69; 156/583.3; 219/243

[58] Field of Search ........... 53/298, 329, 373, 300, 53/367, 368, 297; 219/243; 156/583.1, 583.3, 69, 398

[56] References Cited
U.S. PATENT DOCUMENTS

| | | | |
|---|---|---|---|
| 1,856,827 | 5/1932 | Carruthers | 53/367 X |
| 3,112,587 | 12/1963 | Anderson et al. | 53/296 X |
| 3,401,498 | 9/1968 | Garvin | 53/297 X |
| 3,587,829 | 6/1971 | Sorensen | 53/300 X |
| 3,779,838 | 12/1973 | Wech | 219/243 X |
| 3,792,566 | 2/1974 | Kinney | 53/298 |
| 3,927,506 | 12/1975 | Abd-Alla | 53/297 X |
| 3,955,341 | 5/1976 | Wilhere | 53/367 X |

Primary Examiner—Horace M. Culver
Attorney, Agent, or Firm—Rodgers & Rodgers

[57] ABSTRACT

For sealing the open end of a flanged container, a heated reciprocable sealing block having a heat emitting surface is arranged with its path of reciprocatory movement in general alignment with a container to be sealed and a sealing head is mounted on the sealing block by mounting means which is arranged to maintain a part of the sealing head in close heat transferring contact with the heat emitting surface of the sealing block and is also adapted to accommodate moderate misalignment of the sealing block and the container to be sealed. Containers to be sealed are mounted on individual carrier plates which are movable intermittently through an enclosure which may serve to isolate the sealing operation from atmosphere, the containers being sealed by a strip of lid stock which is secured by the sealing block to the flanges of the open ended containers. Following a sealing operation, the lid stock is gripped and severed so that each container is provided with an individual cover.

10 Claims, 4 Drawing Figures

HEAT SEALING APPARATUS

TECHNICAL FIELD

This invention relates to a packaging apparatus for closing and filling flanged containers, which may be sterile, by heat sealing means.

BACKGROUND ART

Conventional heat sealing arrangements employ a heated bar or plate that is brought into contact with the back of a flexible material which is sealed to a semi-rigid material. Since the sealer is rigid, it cannot compensate for irregularities in either material being sealed.

Another known heat sealing arrangement utilizes a fluid heated heat sealing member which includes a body of material of low thermal conductivity and a strip of material of high thermal conductivity in communication with a heat exchange fluid passage formed in the body of low thermal conductivity. In this known arrangement non-yieldable pressure applying elements are utilized which are not well adapted for applying uniform sealing pressure and temperature to irregular areas to be sealed. U.S. Pat. No. 4,062,718 is representative of this known arrangement.

Another known device for sealing covers to containers utilizes a non-yieldable element arranged to apply heat and pressure to the lid of a container thereby to seal the lid to the container flange and is arranged to cooperate with a yieldable beveled compressible member against which the container flange rests. In this arrangement the sealing pressure and temperature may not be applied uniformly throughout the sealing area due in part at least to the beveled or inclined disposition of the sealing surface of the yieldable compressor element. Canadian Pat. No. 957,662 is representative of this known device.

Still another arrangement for sealing containers utilizes a heated sealing head having a groove over which a flexible membrane is secured and in which heated liquid is disposed. Thus the flexible membrane together with the heated liquid forms a readily adaptable structure which conforms to any surface irregularities and to a degree of misalignment between the sealing head and the open end of the flanged cup-shaped container to be sealed. U.S. patent application Ser. No. 929,512 filed July 31, 1978 and assigned to the assignee of this invention is representative of such apparatus.

DISCLOSURE OF THE INVENTION

According to this invention in one form, a container to be sealed is disposed in general alignment with the path of reciprocatory travel of a sealing block having a heat emitting surface to which a sealing head is mounted by mounting means which maintains a part of the sealing head in close heat transferring contact with the heat emitting surface of the sealing block and which also accommodates limited sliding movement of the sealing head relative to the sealing block so that moderate misalignment of the sealing block and the container to be sealed may be readily accommodated by shifts in position of the sealing head relative to the sealing block.

According to one facet of the invention, containers to be filled and sealed are supplied to the region of the sealing block and sealing head on a series of interconnected carrier plates each of which is provided with resilient means on which the individual containers are yieldably mounted. By this means moderate misalignment of the reciprocable sealing block relative to a particular container can be accommodated.

According to another feature of the invention, yieldable holding means mounted on the reciprocable sealing block is engageable with a strip of lid stock so as to hold the lid stock in position relative to the carrier plates, and cutter means adjustably mounted on the reciprocable sealing block is arranged to sever the lid stock sealed to one container from the lid stock to be applied to a succeeding container.

In accordance with still another feature of the invention, the filling and sealing operations may be effected in an enclosing structure which serves to isolate the sealing apparatus and container from atmosphere so as to effect filling and sealing under aseptic conditions.

BRIEF DESCRIPTION OF THE DRAWINGS

For a better understanding of the invention, reference may be had to the accompanying drawings in which.

BEST MODE OF CARRYING OUT THE INVENTION

Figure 1:
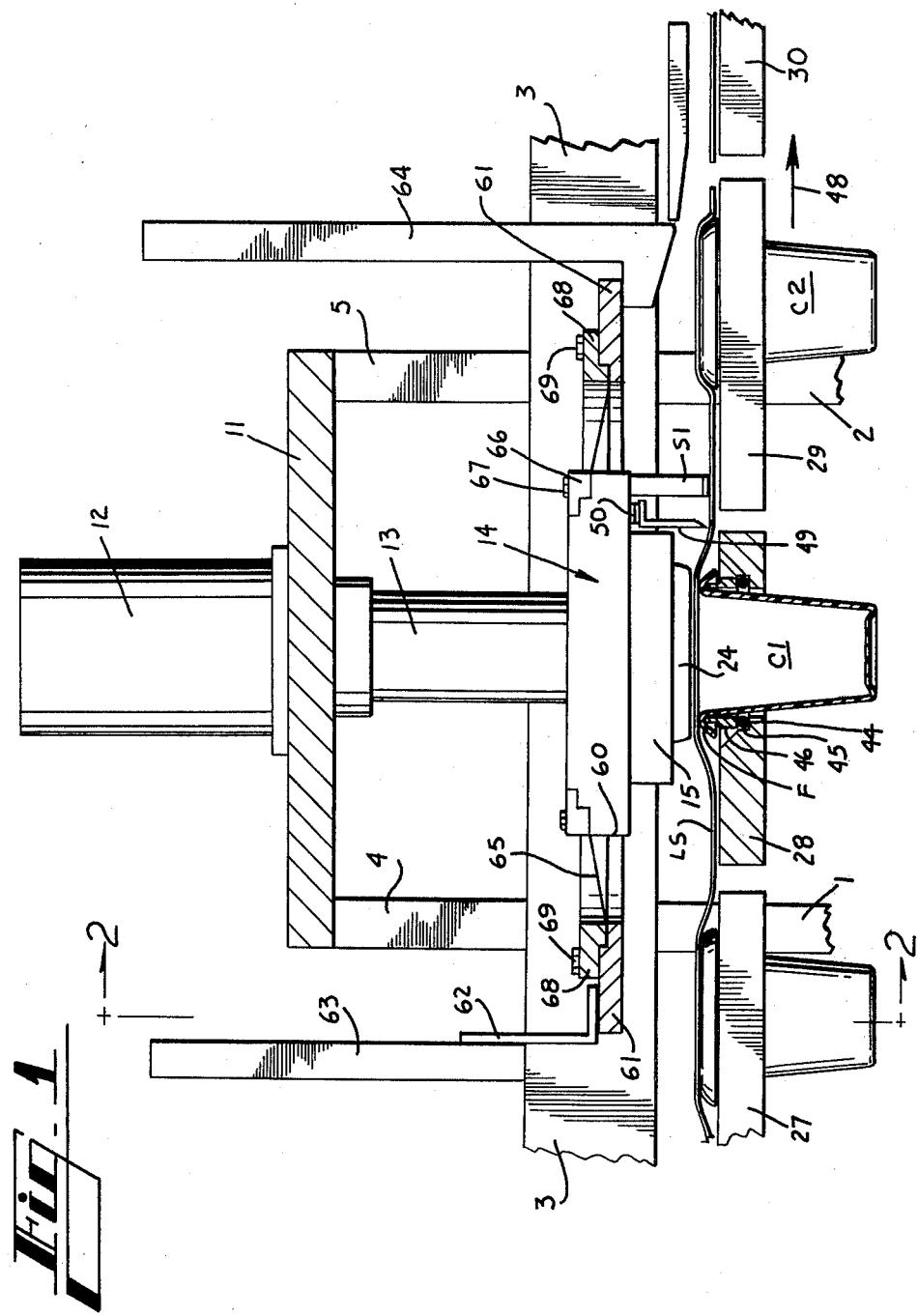
FIG. 1 is a somewhat schematic side view partially in section of a sealing apparatus constructed according to one form of the invention.

With reference to FIG. 1, a pair of support posts 1 and 2, the lower ends of which are broken away for clarity, serve to support horizontal channel element 3. Mounted atop channel 3 are support posts 4 and 5. As is apparent from FIG. 2 post 4 is secured atop channel 3 by clamping element 6 and bolt 6a. As is apparent from FIG. 2, the near side of the machine as observed in FIG. 1 includes a horizontal channel 7 which is supported by posts such as that indicated at 8 and support post 9 is mounted atop channel 7 by clamping element 10 and bolt 10a.

Figure 2:
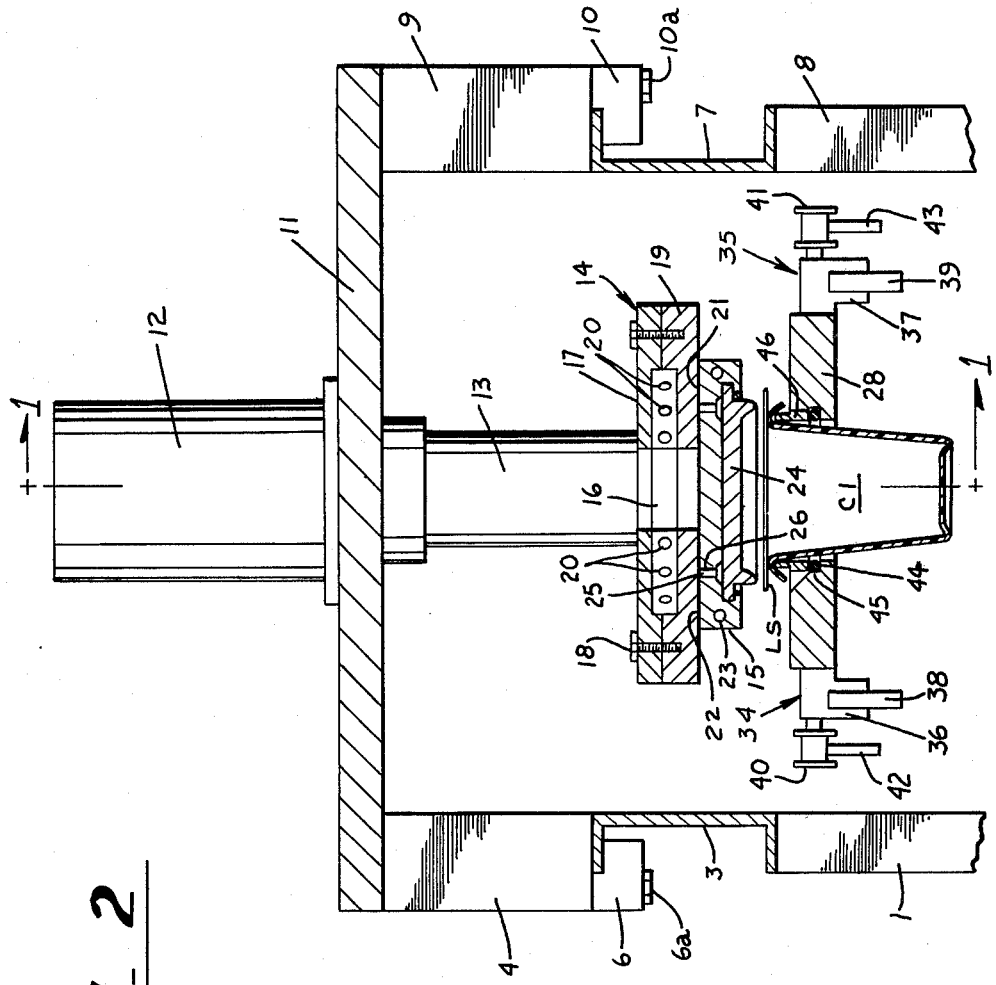
FIG. 2 is a cross sectional view taken along the line generally designated 2—2 in FIG. 1 but which omits certain elements for clarity.

For supporting the main elements of the sealing apparatus, a rectangular plate 11 is supported at its corners by posts 4, 5, 9 and by another post which is behind post 9 as viewed in FIG. 2 and which is thus not observable in the drawings.

For imparting reciprocatory motion to the sealing elements, an actuator 12 is mounted atop plate 11 and may be of the pneumatic or electromagnetic type as may be desired. Actuator 12 imparts vertical reciprocatory motion to plunger 13 which in turn imparts reciprocatory vertical motion to the sealing block 14 and to the sealing head 15 since sealing block 14 is securely affixed by pin 16 to the lower end of plunger 13 and since sealing head 15 is secured by mounting means formed according to this invention to the lower heat emitting surface of sealing block 14.

As is best shown in FIG. 2, sealing block 14 includes a cover plate 17 formed of insulating material and which is secured by bolts 18 to the lower base portion 19 of sealing block 14.

For the purpose of heating the sealing block 14, suitable heating means such as electric coils 20 are disposed within the base 19 of sealing block 14 and are covered by insulating cover 17. The lower surface 21 of the base part 19 of the sealing block 14 thus constitutes a heat emitting surface.

Heat derived from heat emitting surface 21 is supplied to the sealing head 15 whose upper surface 22 constitutes a flat part which is in close heat transferring contact with heat emitting surface 21. Sealing head 15 may be provided with supplementary heating means 23 as best shown in FIG. 3 which may take the form of electric heater elements energy to which is supplied by known means not shown in the drawings.

Figure 3:
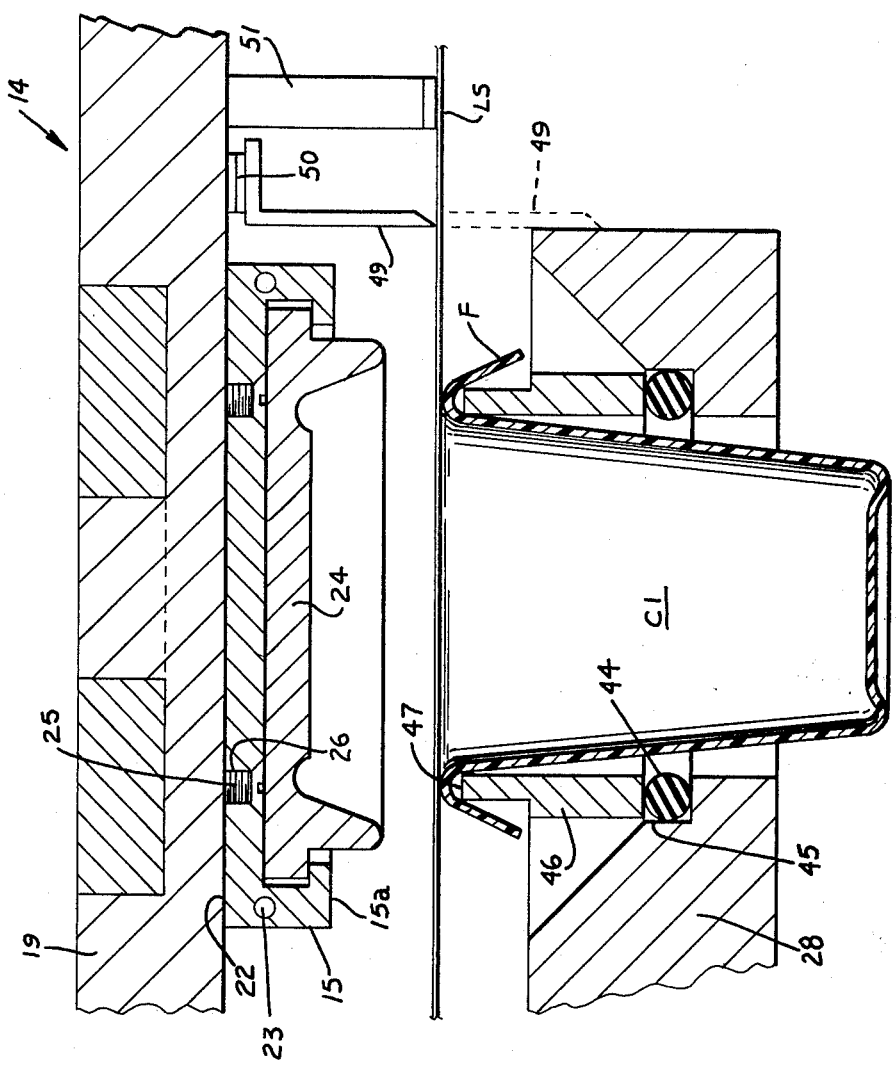
FIG. 3 is an enlarged cross sectional view of certain parts of FIG. 1.

Secured to the lower surface of sealing head 15 is a sealing pad 24 which as is best shown in FIG. 3 is held in position by flange 15a formed integrally with sealing head 15. Preferably sealing pad 24 is formed of silicone rubber and if desired may be impregnated with powdered metallic material so as to facilitate heat conduction therethrough.

In order to accommodate minor misalignment of a container such as that indicated at C1 with the sealing block 14 and the sealing head 15, sealing head 15 is provided with mounting means which allows limited horizontal and circumferential movement of sealing head 15 relative to sealing block 14. Such mounting means according to one form of the invention may constitute mounting studs 25 which are secured to the base portion 19 of sealing block 14 and which are received within oversize apertures 26 formed in the body portion of sealing head 15. Thus limited horizontal movement of sealing head 15 relative to sealing block 14 is accommodated according to one feature of the invention.

A series of containers such as "C" are supplied to the region of the sealing apparatus by means of a plurality of carrier plates such as those which are schematically represented in the drawings and designated by the numerals 27–30. As is best shown in FIG. 2 carrier plates such as 28 are provided with side flanges such as are indicated at 34 and 35. These flanges are provided with grooves 36 and 37 which receive static guides 38 and 39 and which also obviously take the weight of the plates such as 28 and the associated cup such as C1.

Motion is imparted to the interconnected carrier plates such as 27–30 by means of a pair of pull chains 40 and 41 which support the carrier plates and which are arranged to ride along fixed guides 42 and 43. These chains are endless elements and are driven in known manner by suitable sprockets not shown.

For the purpose of yieldably mounting the containers such as C1 on carrier plates such as 28, resilient support means are provided and may include an O-ring such as is indicated at 44 which is mounted in a groove such as is indicated at 45 formed in each carrier plate such as 28. Disposed atop O-ring 44 is a yieldable support ring such as 46. As is apparent in FIG. 3 the flange F of container C1 rests atop the upper surface 47 of support ring 46. Since the O-ring 44 is of yieldable material, it is obvious that the support 46 may shift position and by so doing may shift the position of container C1 so as to accommodate moderate misalignment of the container and the sealing head 15.

As is well known, lids of the containers C are derived from lid stock such as is indicated at LS and which is interposed between the upper open flanged ends of the containers and the sealing head 15.

From the description thus far it is obvious that the lid stock LS is sealed to the top of a container such as C1 by heat applied through the sealing pad 24 to the lid stock LS and thence to the flange F of container C1.

After a particular container such as that shown at C1 in FIG. 1 is sealed, the carrier plate 28 moves to the right and out of the sealing zone as shown in FIG. 1 by the arrow 48. When the container C1 arrives at the position designated C2 as shown in FIG. 1, the lid stock LS is severed by suitable cutting means such as by the blade indicated by the numeral 49 which is mounted to the sealing block 14 as is shown in FIGS. 1 and 3. Adjustable mounting means 50 is provided whereby the height of the lower cutting edge of cutting element 49 may be adjusted.

In order to prevent dislodgment of the cover from a sealed container located at the position indicated in FIG. 1 at C2 by the cutting element 49, suitable holding means such as that indicated at 51 is provided in accordance with a feature of the invention. As is best shown in FIGS. 1, 3 and 4, holding means 51 is arranged to exert a holding pressure atop lid stock LS whereby the lid stock is frictionally held in secure contact with the upper surface 52 of a carrier plate such as that disposed at position 29.

Thus with the lid stock LS frictionally held against the surface 52 of carrier plate 29, downward motion of cutting element 49 does not disturb the cover of a sealed container such as that indicated at position C2.

Figure 4:
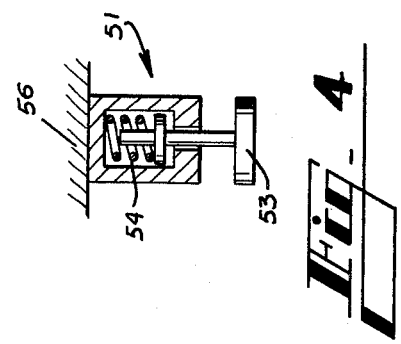
FIG. 4 is a cross sectional view of lid stock holding means.

As is apparent from FIG. 4, the yieldable holding means 51 includes a plunger 53 and a spiral compression spring 54 disposed within housing structure 55 which in turn is mounted to the surface 56 of sealing block 14.

Of course it is essential that the cutting element 49 be adjusted to such a position that the holding pressure of yieldable holding means 51 is firmly operative to secure the lid stock against dislodgment from the container such as C2 before the cutting action of blade 49 begins.

The sealing apparatus of this invention may be used either in an aseptic environment or in a nonaseptic environment. As best shown in FIG. 1, sealing block 14 and sealing head 15 are reciprocable through an opening formed in the machine housing structure such as the opening indicated by the numeral 60 in the ring 61 supported by bracket 62, support element 63 and by support element 64. As is apparent in FIG. 1 flexible grommet shaped sheet 65 is secured about its inner edge to the sealing block 14 by clamping ring 66 and associated bolts 67. The outer periphery of flexible sheet 65 is secured to ring 61 by clamping ring 68 and bolts 69. Since sheet 65 is flexible and secured both to the support ring 61 and to the sealing block 14 in fluid tight relation, it is apparent that reciprocatory movement of sealing block 14 and of sealing head 15 may be effected without exposing the containers to be sealed, their contents, the lid stock or any of the parts of the machine inside the machine enclosure to contamination from the atmosphere.

INDUSTRIAL APPLICABILITY

While the sealing apparatus formed according to this invention may be employed to perform a variety of sealing operations both under aseptic and nonaseptic conditions, the invention is particularly well adapted for use in sealing containers for packaging consumer items such as fruit juices, yogurt, and many other similar items.

The embodiments of the invention in which an exclusive property or privilege is claimed are defined as follows:

1. Container heat sealing apparatus comprising a heated reciprocable sealing block having a heat emitting surface, a sealing head mounted on said sealing block, mounting means for holding a part of said sealing head in close heat transferring slidable contact with said heat emitting surface whereby said sealing head is adapted to accommodate moderate misalignment of said reciprocable sealing block and a container to be sealed which is disposed in general alignment with the path of reciprocatory movement of said sealing block and said sealing head, a container carrier plate having resilient container support means disposed in the path of reciprocable movement of said sealing block, said resilient container support means including a groove formed in said carrier plate and a resilient O-ring disposed in said groove, and a sealing ring supported by said O-ring and engageable with the flange of a container to be sealed and having a flanged open end.

2. Container heat sealing apparatus according to claim 1 wherein a plurality of interconnected carrier plates movable in a direction transverse to the path of movement of said reciprocable sealing block and arranged for sequential disposition individually at a position of alignment with such path of movement, yieldable holding means mounted on said sealing block and engageable with a strip of lid stock disposed between said carrier plates and said sealing block to press said lid stock into engagement with one of said carrier plates for frictionally holding said lid stock in position relative to said carrier plates.

3. Container sealing means according to claim 1 wherein said mounting means comprises a plurality of mounting studs secured to said sealing block at said heat emitting surface and a plurality of oversize apertures in said sealing head for respectively receiving said mounting studs.

4. Container sealing means according to claim 3 wherein said mounting studs respectively include heads which engage parts of said sealing head so as to hold a part of said sealing head in close heat transferring relation to said heat emitting surface.

5. Container heat sealing apparatus according to claim 2 wherein lid stock cutting means is movable with said sealing block and engageable with said lid stock.

6. Container heat sealing apparatus according to claim 5 wherein said lid stock cutting means engages said lid stock only after said lid stock is frictionally held between said one carrier plate and said yieldable holding means.

7. Container heat sealing apparatus according to claim 5 wherein said lid stock cutting means effects a cutting operation after said lid stock is pressed into engagement with said one of said carrier plates.

8. Container heat sealing apparatus according to claim 2 wherein said one of said carrier plates against which said lid stock is pressed is disposed in leading relation to the one of said carrier plates which is then in alignment with the path of movement of said sealing block.

9. Container heat sealing apparatus according to claim 1 wherein supplementary heating means forms a part of said sealing head.

10. Container heat sealing apparatus according to claim 1 wherein a sealing pad of flexible material is mounted on said sealing head and wherein lid stock is interposed between said sealing head and the open end of a container to be sealed, said sealing pad being effective to engage said lid stock and to impart container sealing pressure thereto.

* * * * *